(12) United States Patent
Reum

(10) Patent No.: US 11,201,339 B2
(45) Date of Patent: Dec. 14, 2021

(54) FUEL CELL SYSTEM AND METHOD FOR OPERATING A FUEL CELL SYSTEM

(71) Applicant: PROTON MOTOR FUEL CELL GMBH, Puchheim (DE)

(72) Inventor: Mathias Reum, Munich (DE)

(73) Assignee: PROTON MOTOR FUEL CELL GMBH, Puchheim (DE)

( * ) Notice: Subject to any disclaimer, the term of this patent is extended or adjusted under 35 U.S.C. 154(b) by 438 days.

(21) Appl. No.: 16/321,752

(22) PCT Filed: Jul. 28, 2017

(86) PCT No.: PCT/EP2017/069217
§ 371 (c)(1),
(2) Date: Feb. 26, 2019

(87) PCT Pub. No.: WO2018/020029
PCT Pub. Date: Feb. 1, 2018

(65) Prior Publication Data
US 2019/0288311 A1   Sep. 19, 2019

(30) Foreign Application Priority Data

Jul. 29, 2016 (DE) ...................... 10 2016 114 081.3

(51) Int. Cl.
*H01M 8/04537* (2016.01)
*H01M 8/04828* (2016.01)
(Continued)

(52) U.S. Cl.
CPC ..... *H01M 8/04604* (2013.01); *H01M 8/0491* (2013.01); *H01M 8/0494* (2013.01);
(Continued)

(58) Field of Classification Search
CPC combination set(s) only.
See application file for complete search history.

(56) References Cited

U.S. PATENT DOCUMENTS

| 4,879,189 A | * | 11/1989 | Snopkowski | ......... | H01M 8/249 |
| | | | | | 429/425 |
| 7,465,506 B2 | * | 12/2008 | Faye | ................ | H01M 8/04753 |
| | | | | | 429/410 |

(Continued)

FOREIGN PATENT DOCUMENTS

| DE | 10010985 | 9/2001 |
| DE | 10307856 | 9/2004 |

(Continued)

OTHER PUBLICATIONS

International Preliminary Report on Patentability issued in PCT/EP2017/069217, dated Feb. 7, 2019, 8 pages.

(Continued)

*Primary Examiner* — Kaity V Chandler
(74) *Attorney, Agent, or Firm* — ARC IP Law, PC; Joseph J. Mayo

(57) ABSTRACT

A fuel cell system with a plurality of fuel cell modules connected to form a fuel cell group having first and second electrical supply terminals that terminate to an electrical load; a measuring device connected to the fuel cell modules that measures a load current of the respective fuel cell modules; and a controller that detects a respective operating state of the fuel cell modules. The controller is connected to and controls operation of the fuel cell modules, and detects whether the operating state is in a respective partial load range of the respective fuel cell module. The controller provides a load current demanded by the load in a first partial-load operating mode of the load by operating all fuel cell modules of the fuel cell group such that all of the fuel cell modules are within the respective partial load range of the respective fuel cell module.

14 Claims, 1 Drawing Sheet

Fig. 1

(51) Int. Cl.
  *H01M 8/249* (2016.01)
  *H01M 8/04858* (2016.01)
  *H01M 8/04955* (2016.01)
  *H01M 8/04664* (2016.01)

(52) U.S. Cl.
  CPC ... *H01M 8/04574* (2013.01); *H01M 8/04619* (2013.01); *H01M 8/04626* (2013.01); *H01M 8/04686* (2013.01); *H01M 8/04955* (2013.01); *H01M 8/249* (2013.01)

(56) References Cited

U.S. PATENT DOCUMENTS

| | | | | |
|---|---|---|---|---|
| 9,153,966 | B2* | 10/2015 | Ishida | G07F 15/008 |
| 2004/0033395 | A1* | 2/2004 | Thompson | H01M 8/04343 |
| | | | | 429/429 |
| 2004/0175601 | A1 | 9/2004 | Faye et al. | |
| 2004/0202901 | A1 | 10/2004 | Logan et al. | |
| 2005/0194976 | A1* | 9/2005 | Yumoto | G01R 31/367 |
| | | | | 324/433 |
| 2007/0026273 | A1* | 2/2007 | Okamoto | H01M 8/04097 |
| | | | | 429/414 |
| 2010/0248049 | A1* | 9/2010 | Gottmann | H01M 8/04932 |
| | | | | 429/428 |
| 2013/0059215 | A1* | 3/2013 | Kawahara | H01M 8/04649 |
| | | | | 429/413 |
| 2013/0181526 | A1* | 7/2013 | Iwasaki | H02J 3/386 |
| | | | | 307/43 |
| 2015/0303497 | A1* | 10/2015 | Kim | H01M 4/92 |
| | | | | 429/410 |
| 2016/0082859 | A1* | 3/2016 | Yang | H01M 10/425 |
| | | | | 701/22 |
| 2017/0125774 | A1* | 5/2017 | Choi | H01M 50/543 |
| 2018/0159111 | A1* | 6/2018 | Wang | H01M 50/172 |
| 2018/0183020 | A1* | 6/2018 | Ju | H01M 10/0413 |

FOREIGN PATENT DOCUMENTS

| | | | |
|---|---|---|---|
| DE | 102004017848 | 11/2004 | |
| DE | 102009056029 | 6/2011 | |
| RU | 2377589 C2 * | 12/2009 | ........ H01M 8/04679 |

OTHER PUBLICATIONS

International Search Report and Written Opinion issued in PCT/EP2017/069217, dated Oct. 2, 2017, 12 pages.
German Search Report issued in DE102016114081.3, dated Feb. 13, 2017; 12 pages.

* cited by examiner

FUEL CELL SYSTEM AND METHOD FOR OPERATING A FUEL CELL SYSTEM

This application is a National Stage Filing of PCT/EP2017/069217 filed 28 Jul. 2017 that claims priority to German Patent Application Serial No. 10 2016 114 081.3, filed on 29 Jul. 2016.

BACKGROUND OF THE INVENTION

Field of the Invention

The invention relates to a fuel cell system comprising a plurality of fuel cell modules and to a method of operating such a fuel cell system.

Description of the Related Art

Fuel cells generate electrical energy from hydrogen and oxygen. Oxygen is usually supplied in the form of air, and hydrogen is supplied from a reservoir or generated locally, for example from methanol. The fuel cells are typically grouped together into one or more fuel cell stacks and together with numerous peripheral elements, such as lines for supplying fresh operating gases and cooling water, for discharging and/or recirculating used operating gases and cooling water, sensors, valves, controllers, switches, heaters, etc., without which the operation of the fuel cells would not be possible, constitute a fuel cell module. Some of these components are provided with protective covers, housings or sheaths, and all components or at least most of the components are assembled as compactly as possible and accommodated together with the fuel cells in a housing.

A plurality of such fuel cell modules may be combined to form a fuel cell system in which the fuel cell modules are electrically connected in parallel or in series to supply a supply voltage and a load current to an electrical load connected to the fuel cell system. By providing a plurality of fuel cell modules in a fuel cell system, a relatively simple adaptation to specific voltage and/or power requirements or demands of the electrical load can be made. For example, by connecting a plurality of fuel cell modules in series, a higher operating voltage and a higher power output can be provided.

In this regard, an aim in operating the load by way of the fuel cell system usually consists in avoiding greatly changing operating conditions of the fuel cells, so that no complex, fast-reacting control of the supply of chemical energy carriers is required and also the service life of the fuel cell is not adversely affected by heavy load fluctuations.

BRIEF SUMMARY OF THE INVENTION

An object of the present invention is to provide a fuel cell system comprising a plurality of fuel cell modules and a method of operating such a fuel cell system, in which the fuel cells can be operated with a long service life.

The invention relates to a fuel cell system comprising a plurality of fuel cell modules and to a method of operating such a fuel cell system in accordance with the independent claims. Advantageous embodiments and further developments are specified in the dependent claims.

According to a first aspect, the invention relates to a fuel cell system comprising a plurality of fuel cell modules which are connected so as to form a fuel cell group having first and second supply terminals configured to be terminated to an electrical load, a measuring device connected to the fuel cell modules and configured to measure a load current of the respective fuel cell modules, and a controller for detecting a respective operating state of the fuel cell modules by way of the load current of the respective fuel cell module measured by the measuring device, said controller being connected to the fuel cell modules for controlling the operation of the fuel cell modules. The controller is configured to provide a load current demanded or requested by the load in a full-load operating mode by operating all fuel cell modules, and to provide a load current demanded by the load in a partial-load operating mode of the load by operating all or part of the fuel cell modules. Furthermore, the controller is configured to detect whether the operating state of the fuel cell modules is in a respective partial load range of the respective fuel cell module, said partial load range being defined by a lower limit above a load current of zero and an upper limit below a full load current. Moreover, the controller is configured to provide a load current demanded by the load in a first partial-load operating mode of the load by operating all fuel cell modules of the fuel cell group such that all fuel cell modules of the fuel cell group are within the respective partial load range of the respective fuel cell module.

The invention provides the advantageous effect that, depending on the power requirement of the load, the load current or the power to be output can be distributed to the individual fuel cell modules of the fuel cell group such that the service life thereof can be optimized. The power management according to the invention is thus applicable primarily during a partial-load operating mode of the load, in which not the full power (rated power) of all fuel cell modules has to be provided simultaneously. Rather, all fuel cell modules of the fuel cell group are operated likewise in a partial-load operating mode in accordance with the load demanded or requested, in the partial load range that is preferably advantageous for them as regards the service life thereof. In this regard, an aim of the power management (which is implemented in the controller) to be achieved may consist in subjecting all fuel cell modules present in the fuel cell system or fuel cell group to equal or approximately equal wear and to operate each module as often as possible in a partial load range which is advantageous for said module.

On the basis of the inventors' finding that a fuel cell generates low degradation-rate electrical power in such a partial load range due to electrochemical processes which result only in comparatively little wear of components of the fuel cell module, this range can also be referred to as the "comfortable range" or "comfort range" of a fuel cell. On the other hand, a fuel cell outside such a "comfort range" also has operating ranges that the inventors have recognized as having higher degradation rates and adversely affecting the service life of the fuel cells when the fuel cells are operated comparatively long in these modes of operation. According to the invention, such an advantageous partial load range ("comfort range" with lower degradation rate) is defined by a lower limit above a load current of zero and an upper limit below a full load current.

Overall, with the aid of the invention, there can thus be provided a fuel cell system comprising a plurality of fuel cell modules and a method of operating such a fuel cell system, in which the fuel cells can be operated with a comparatively long service life.

When similar fuel cells or fuel cell modules are used, the advantageous partial load ranges for the respective fuel cell modules of the fuel cell group can be defined the same substantially for all fuel cell modules of the fuel cell group, that is, the respective partial load ranges of the fuel cell modules of the fuel cell group have a substantially identical lower limit and identical upper limit. However, the respective partial load ranges can also be defined differently, that is, with mutually different lower and/or upper limit, for example, when different types of fuel cells are used in the fuel cell modules of the fuel cell group, which have different "comfort ranges". Also, for part of the fuel cell modules having a mutually alike fuel cell type, there may be defined a first partial load range, and for another part of the fuel cell modules having another mutually alike fuel cell type, there may be defined a second partial load range, etc.

According to an embodiment, the respective partial load range of the respective fuel cell module is defined by a lower load current density above a load current density of zero and an upper load current density below a full load current density.

According to an embodiment, the lower load current density is approximately 0.35 A/cm$^2$ and the upper load current density is approximately 0.75 A/cm$^2$.

According to an embodiment, the controller is configured to provide a load current requested or demanded by the load in a lower second partial-load operating mode of the load by operating all fuel cell modules such that all fuel cell modules are in an operating state at the lower limit of the respective partial load range of the respective fuel cell module.

In particular, the controller is configured to provide a load current demanded by the load in a third partial-load operating mode of the load which is still lower than the second partial-load operating mode by operating only part of the fuel cell modules of the fuel cell group such that the operating state of the operated part of the fuel cell modules is within the respective partial load range of the respective fuel cell module and the non-operated part of the fuel cell modules is deactivated.

In accordance with an embodiment, the controller is configured to detect whether the operating state of one of the fuel cell modules is within the partial load range of the respective fuel cell module, and in the event that the operating state of the fuel cell module is detected to be outside the partial load range of the respective fuel cell module, one or more of the fuel cell modules of the fuel cell group is deactivated by the controller.

According to an embodiment, a respective load current to power correlation for the fuel cell type of the respective fuel cell modules is stored in the controller in order to detect the operating state of the respective fuel cell module. Advantageously, the load current to power correlation is stored in the controller in the form of a load current to power characteristic.

According to a further embodiment, the controller is configured to record an operating time of one or more of the fuel cell modules over various load ranges, and then processes these recorded data in order to determine which one of the fuel cell modules, at a current load demand, is operated or not operated in the partial-load operating mode of the load.

Advantageously, the controller is configured to determine which of the fuel cell modules is operated or not operated, such that the operating times of the fuel cell modules are equalized over the various load ranges.

In accordance with an embodiment, the controller is configured to calculate a produced amount of energy of the respective fuel cell modules. In this regard, the controller can be configured such that at least for part of the fuel cell modules a ranking is calculated with respect to the respective amount of energy produced.

In particular, the controller may be configured to detect whether the operating state of one of the fuel cell modules is in the partial load range of the respective fuel cell module, and in the event that the operating state of the fuel cell module is detected to be outside the partial load range of the respective fuel cell module, one or more of the fuel cell modules of the fuel cell group with the highest amount of energy produced is deactivated by the controller.

In accordance with another aspect, the invention relates to a method of operating a fuel cell system comprising a plurality of fuel cell modules which are connected to form a fuel cell group having first and second supply terminals configured to be connected to an electrical load. In this context, the method comprises the following steps:

measuring a load current of the respective fuel cell modules, detecting a respective operating state of the fuel cell modules by way of the load current measured of the respective fuel cell module, providing a load current requested or demanded by the load in a full-load operating mode by operating all fuel cell modules, and a load current demanded by the load in a partial-load operating mode of the load by operating all or part of the fuel cell modules, wherein it is detected whether the operating state of a fuel cell module is in a respective partial load range of the respective fuel cell module, said partial load range being defined by a lower limit above a load current of zero and an upper limit below a full load current, wherein a load current demanded by the load, in a first partial-load operating mode of the load, is provided by operating all fuel cell modules of the fuel cell group such that all fuel cell modules of the fuel cell group are within the respective partial load range of the respective fuel cell module.

The functions of the controller described above and in the following can also be used in analogous manner in such a method as respective method steps. All embodiments and examples described in this disclosure are applicable analogously with such an operating method.

BRIEF DESCRIPTION OF THE DRAWINGS

In the following, the invention will be explained in more detail in the form of an embodiment thereof with reference to the sole drawing FIGURE.

DETAILED DESCRIPTION OF THE INVENTION

Figure 1:
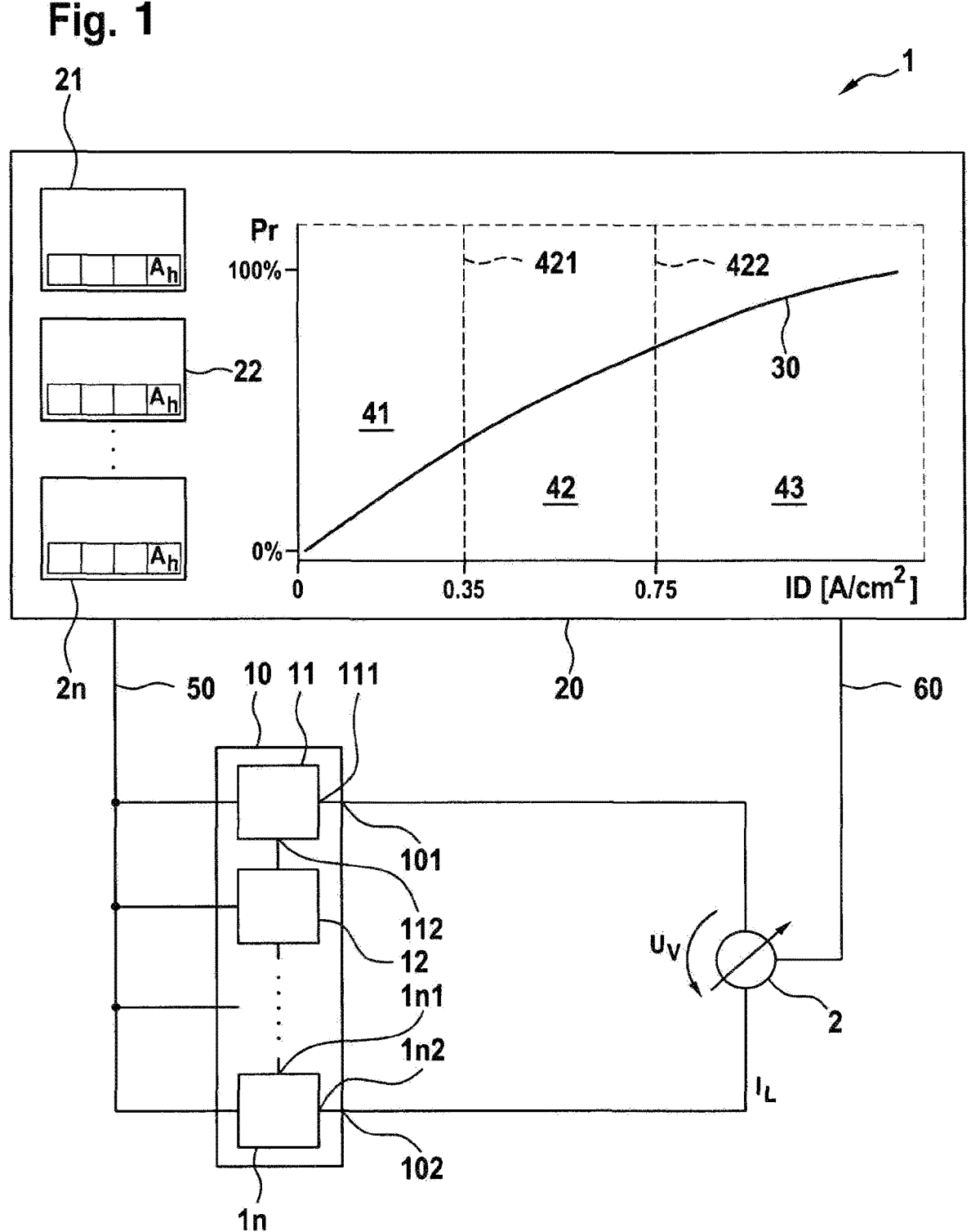
FIG. 1 shows an exemplary embodiment of a fuel cell system in accordance with aspects of the invention.

A fuel cell system 1 comprises a plurality of fuel cell modules 11, 12, . . . , 1n. These are connected to form a fuel cell group 10. Within the fuel cell group 10, the fuel cell modules may be connected in parallel or in series, or in a combination of both. The fuel cell group 10 has a first electrical supply terminal 101 and a second electrical supply terminal 102 which are configured to be connected to an electrical load 2. In the connected state, the supply voltage Uv for powering the load 2 is applied to the supply terminals 101 and 102 of the fuel cell group 10. The load 2 may generally include, for example, one or more electrical consumers, power converters and/or other electrical components of an electrical load circuit, and is representative of electrical components that are connected to the fuel cell group 10 on the consumption side for taking off a load current.

The fuel cell modules 11, 12, ..., 1n themselves each have two electrical supply terminals which, during operation of the respective fuel cell module, have an electrical module voltage applied thereto in order to generate a load current. The fuel cell group 10 may have two or more fuel cell modules 11-1n, which can be connected in known manner in parallel or in series (as shown in the FIGURE) in order to supply a load current to the electrical load 2. A partially parallel and partially serial interconnection is possible as well, as known to the expert in a variety of forms. For example, the fuel cell module 11 has electrical supply terminals 111, 112; in the present embodiment, the supply terminal 111 constitutes the supply terminal 101 of the fuel cell group 10 connected to the load 2, and the supply terminal 112 is connected to an electrical supply terminal of the fuel cell module 12. Accordingly, the other fuel cell modules of the fuel cell group 10 have electrical supply terminals which, according to the interconnection selected (in series or parallel), are connected to a respective supply terminal of another fuel cell module. Accordingly, the fuel cell module 1n has electrical supply terminals 1n1 and 1n2 wherein, in the present embodiment, the supply terminal 1n2 constitutes the other supply terminal 102 of the fuel cell group 10, which is connected to the load 2. By means of a series connection of the fuel cell modules 11-1n, there can be generated an operating voltage Uv at the load 2 which is a multiple of the individual voltages of the fuel cell modules. In addition, a power supply of the load 2 is possible which, in the full-load operating mode, corresponds to the sum of the powers of the fuel cell modules 11-1n of the fuel cell group 10.

The fuel cell system 1 moreover comprises a controller 20 for the fuel cell group 10. This controller serves, on the one hand, for detecting a respective operating state of the fuel cell modules 11-1n on the basis of a measured load current of the respective fuel cell module. On the other hand, the controller 20 is connected to the fuel cell modules 11-1n of the fuel cell group 10 for controlling the operation of the fuel cell modules 11-1n. To this end, the controller 20 is electrically connected to the fuel cell modules 11-1n via the electrical line 50 and, for operation in the fuel cell system 1, can switch the same individually on and off, or can also individually control or regulate the electrical parameters thereof, such as module output voltage, module output current and/or power output. The expert for this purpose can make use of control or regulating mechanisms in the interaction between the controller 20 and the fuel cell modules 11-1n that are sufficiently known in the art. For example, the controller 20, for controlling the respective module output current and thus the respective operating range, controls the supply of the chemical energy carriers (not shown in the FIGURE) via the line 50 in correspondingly individual manner.

Furthermore, there is provided a measuring device which is connected to the fuel cell modules 11-1n of the fuel cell group 10 and is configured to measure a load current of the respective fuel cell modules 11-1n. In the present exemplary embodiment, individual measuring modules 21-2n are provided in the controller 20, which may be implemented in hardware or software, or a combination thereof, which on the one hand measure the load current of the respective fuel cell module and in the present example also measure an associated operating time. In this way, a parameter (e.g. load current over a certain operating time in Ah) can be calculated, on the basis of which a produced amount of energy of the respective fuel cell module 11-1n can be calculated. In the present exemplary embodiment, the measuring modules 21-2n are part of the controller 20, for example in the form of one or more calculation modules, by means of which the microprocessor of the controller 20 calculates the respectively required parameters. Via the line 50, corresponding physically measured measuring signals are made available to the measuring modules 21-2n, such as load current and operating voltage. The measuring module 21 measures or calculates the desired parameters with respect to the fuel cell module 11, the measuring module 22 with respect to the fuel cell module 12, etc. The measuring modules 21-2n may be coupled to, or may include, suitable power, voltage, and/or power measuring devices (not explicitly shown in the FIGURE) via the line 50 or other connection, and/or may have corresponding time measuring devices implemented therein or be connected to the same, etc., in order to measure and process the corresponding physical parameters.

In the controller 20, there is stored, furthermore, a load current to power correlation 30 for the fuel cell type of the respective fuel cell modules 11-1n of the fuel cell group 10. In a case where all fuel cell modules 11-1n have the same type of fuel cells, it is sufficient to store only one load current to power correlation 30 for all fuel cell modules. However, if different types of fuel cells are used in the fuel cell group 10, it is expedient to store a respective load current to power correlation 30 for each fuel cell type.

For example, the load current to power correlation is stored in the form of a load current to power characteristic 30, as exemplified in the FIGURE. In the present embodiment, the load current to power characteristic 30 indicates a relative power output Pr of the respective fuel cell module (between 0% and 100% with respect to the rated power of the fuel cell module) depending on the load current density ID (load current relative to the electrochemical reaction area of the fuel cell, measured in $A/cm^2$).

On the basis of the load current to power characteristic 30, the operating state of the respective fuel cell module 11-1n can be detected. According to the invention, a respective fuel cell module has a plurality of operating ranges, for example a lower partial load range 41, a middle partial load range 42 and an upper partial load range 43. In particular, the respective middle partial load range 42 is defined by a lower limit 421 above a load current of zero and an upper limit 422 below a full load current. In the present embodiment of the load current to power characteristic 30, the respective partial load range 42 is defined by a lower load current density 421 above a load current density of zero and an upper load current density 422 below a full load current density.

The partial load range 42 is defined such that the respective fuel cells of the module generate low degradation-rate electrical power in this partial load range. As described above, this range 42 may also be referred to as a "comfort range" of a fuel cell. The other operating ranges 41 and 43 have higher degradation rates, with a prolonged operation of the fuel cells in these operating ranges 41, 43 having a negative impact on the service life of the fuel cells.

For defining an advantageous partial load range 42, the lower load current density 421 is approximately 0.35 $A/cm^2$ and the upper load current density 422 is approximately 0.75 $A/cm^2$. Operation of the fuel cell module with load current densities within this range 42 results in comparatively low degradation rates, so that it is desirable to operate the fuel cells in this range as long as possible. In the present embodiment, load ranges below a load current density of 0.35 $A/cm^2$ (mainly due to excessively high cell voltages and condensation of liquid water) and above a load current density of 0.75 A/cm² (especially due to local temperature peaks and mass transport problems) are defined as potentially harmful operating modes.

According to the invention, the controller 20 controls the fuel cell system 1 such that a load current IL demanded or requested by the load 2 in a full-load operating mode is provided by operation of all fuel cell modules 11-1n of the fuel cell group 10. On the other hand, a load current IL demanded by the load 2 in a partial-load operating mode of the load is provided by operating all or only part of the fuel cell modules 11-1n of the fuel cell group 10, depending on the magnitude of the demanded load current. One or more parameters characteristic of a load demand (and thus the demanded load current) of the load 2 are transmitted via the line 60 to the controller 20.

Moreover, the controller 20 detects whether the operating state of the fuel cell modules 11-1n is in the respective partial load range 42 ("comfort range") of the respective fuel cell module. In case the load demand in a first partial-load operating mode of the load is less than the rated load (e.g. 40-60% of the rated load), the controller 20 controls the fuel cell modules 11-1n (e.g. the supply of the chemical energy carriers thereof) such that the load current IL demanded by the load 2 is provided by operation of all fuel cell modules 11-1n of the fuel cell group 10 such that all fuel cell modules 11-1n of the fuel cell group 10 are within the respective partial load range 42 ("comfort range").

If, on the other hand, a demanded load current IL is detected in a lower second partial-load operating mode of the load (e.g. in the range of 30-40% of the rated load), the load current IL will still be provided by operation all fuel cell modules 11-1n of the fuel cell group 10, such that all the fuel cell modules 11-1n of the fuel cell group 10 are in an operating state at the lower limit 421 of the partial load range 42. Thus, all fuel cell modules of the fuel cell group 10 are still operated in the respective "comfort range", even in case of a lower partial load.

Only when a demanded load current IL is detected in a third partial-load operating mode of the load which is still lower than the second partial-load operating mode (e.g. below 30% of the rated load), does the controller 20 control the fuel cell modules such that the operating state of the still operated part of the fuel cell modules 11-1n is within the partial load range 42, while the non-operated part of the fuel cell modules 11-1n is deactivated. Thus, it is still ensured that as many fuel cell modules as possible are operated in the partial load range 42 that is advantageous for them.

Furthermore, the controller 20 may be configured to record an operating time of one or more of the fuel cell modules 11-1n over the various load ranges 41, 42, 43 and process these recorded data in order to determine which one of the fuel cell modules 11-1n, with respect to a current load demand, is operated or not operated in the partial-load operating mode of the load 2.

For example, the fuel cell modules 11-1n are operated such that the operating times of the fuel cell modules are equalized across the various load ranges 41, 42, 43. It is thus possible to achieve a more uniform degradation rate or service life across all fuel cell modules.

In addition, the controller 20 may be configured to calculate a ranking with respect to the respective amount of energy produced at least for part of the fuel cell modules 11-1n. If, for example, the operating state of one of the fuel cell modules 11-1n is outside the partial load range 42 of the respective fuel cell module, the fuel cell modules 11-1n with the highest amount of energy produced are deactivated by the controller 20. It is thus possible to further equalize or adjust the operating times and lifetimes of the fuel cell modules.

It is thus possible to distribute the load current to the individual fuel cell modules in accordance with the power demanded, so that the service life thereof is optimized. The power management of the controller thus takes effect primarily in the partial-load operating mode of the fuel cell system. A basic idea consists in operating all fuel cell modules installed in the system at full load with their maximum permissible continuous load (generally referred to as rated power). However, if the load of the consumer is lowered, it is possible to shut down only one fuel cell module at a time in successive manner (or to completely deactivate the same), while the others remain at the rated load for as long as possible. However, the inventors have recognized this as being disadvantageous in so far as, in case of fuel cell modules which are permanently operated at the rated load, there is prevailing a relatively high degradation rate which impairs the service life. On the other hand, according to the invention, all fuel cell modules are operated likewise in the advantageous partial load range in accordance with the load demand. The aim of such a power management system is to subject all the fuel cell modules present in the system to equal wear or almost equal wear, and in doing so, to operate each module as often as possible in its advantageous partial load range ("comfort range"). Such a range has been identified in particular between a lower load current density of approximately 0.35 A/cm² and an upper load current density of approximately 0.75 A/cm².

The power management of the controller, in case of load demands or requests in the deep partial load range, controls all fuel cell modules present in the fuel cell system preferably equally towards the lower limit of the "comfort range". If the power requirement of the load demands still less load current, the controller will start to shut down individual modules completely and to power up the remaining fuel cell modules back into the "comfort range" so that the load requirement is still covered. Advantageously, the power management of the controller includes an operating hours counter that records the operating time of each module over different load ranges, and then automatically decides, based on this data, which module is shut down in such a case in order to equalize the operating times of all modules.

As was already described in more detail hereinbefore, the following calculation and control tasks are advantageously implemented in the controller 20: processing of the power requirement of the overall system (in the instant case by software); calculation of the necessary load current on the basis of all fuel cell modules contained in the fuel cell system (in the instant case software); checking the result for adherence to the advantageous partial load range ("comfort range") for the individual fuel cell modules (in the instant case software); in case of a negative result (falling below the partial load range), triggering the shutdown of the module(s) with the highest amount of energy produced (in the instant case software). The controller comprises one or more microprocessors capable of implementing the functions mentioned by means of corresponding memory, interface and other hardware components. However, it is also possible to implement these functions only partially in the controller 20 and/or to resort to a distributed control system in which the functions are divided among multiple entities such as microprocessors and their memories.

What is claimed is:

1. A fuel cell system, comprising:
fuel cell modules comprising a plurality of fuel cell modules connected so as to form a fuel cell group having first and second electrical supply terminals configured to be terminated to a load comprising an electrical load,
a measuring device connected to the fuel cell modules and configured to measure a load current of respective fuel cell modules,
a controller for detecting an operating state comprising a respective operating state of the fuel cell modules by way of the load current of the respective fuel cell modules measured by the measuring device, said controller being connected to the fuel cell modules for controlling operation of the fuel cell modules,
wherein the controller is configured to provide a load current demanded by the load in full-load operating mode by operating all fuel cell modules, and to provide a load current demanded by the load in a partial-load operating mode of the load by operating all or part of the fuel cell modules,
wherein the controller is configured to detect whether the respective operating state of the fuel cell modules is in a respective partial load range of the respective fuel cell modules, said respective partial load range being defined by a lower limit above a load current of zero and an upper limit below a full load current,
wherein the controller is configured to provide a load current demanded by the load in a first partial-load operating mode of the load by operating said all fuel cell modules of the fuel cell group such that said all fuel cell modules of the fuel cell group are within the respective partial load range of the respective fuel cell modules;
wherein the controller is configured to calculate a produced amount of energy of the respective fuel cell modules; and,
wherein the controller is configured to calculate a ranking with respect to a respective amount of said energy produced at least for said part of the fuel cell modules.

2. The fuel cell system of claim 1, wherein the respective partial load range of the respective fuel cell modules is defined by a lower load current density above a load current density of zero and an upper load current density below a full load current density.

3. The fuel cell system of claim 2, wherein the lower load current density is approximately 0.35 A/cm² and the upper load current density is approximately 0.75 A/cm².

4. The fuel cell system of claim 1, wherein the controller is configured to provide a load current demanded by the load in a lower second partial-load operating mode of the load by operating said all fuel cell modules of the fuel cell group such that said all fuel cell modules of the fuel cell group are in an operating state at the lower limit of the respective partial load range of the respective fuel cell modules.

5. The fuel cell system of claim 4, wherein the controller is configured to provide a load current demanded by the load in a third partial-load operating mode of the load which is still lower than the lower second partial-load operating mode by operating only part of the fuel cell modules of the fuel cell group such that the operating state of an operated part of the fuel cell modules is within the respective partial load range of the respective fuel cell modules and an non-operated part of the fuel cell modules is deactivated.

6. The fuel cell system of claim 1, wherein the controller is configured to detect whether the operating state of one of the fuel cell modules of the fuel cell group is within the respective partial load range of said one of the fuel cell modules, and in case of detection that the operating state of said one of the fuel cell modules is outside the respective partial load range of said one of the fuel cell modules, one or more of the fuel cell modules of the fuel cell group is deactivated by the controller.

7. The fuel cell system of claim 1, wherein at least one load current to power correlation for a fuel cell type of the respective fuel cell modules is stored in the controller in order to detect the operating state of the respective fuel cell modules.

8. The fuel cell system of claim 7, wherein the load current to the power correlation is stored in the controller in the form of a load current to power characteristic.

9. The fuel cell system of claim 1, wherein the controller is configured to record an operating time of one or more of the fuel cell modules over different load ranges and to process these recorded data in order to determine which of the fuel cell modules, at a current load demand, is operated or not operated in the partial-load operating mode of the load.

10. The fuel cell system of claim 9, wherein the controller is configured to determine which one of the fuel cell modules is operated or not operated, such that operating times of the fuel cell modules of the fuel cell group are equalized over various load ranges.

11. The fuel cell system of claim 1, wherein the controller is configured to detect whether the operating state of one of the fuel cell modules is in the respective partial load range of said one of the fuel cell modules, and in case of detection that the operating state of said one of the fuel cell modules is outside the partial load range of said one of the fuel cell modules, one or more of the fuel cell modules with a highest amount of said energy produced is deactivated by the controller.

12. A method of operating a fuel cell system having fuel cell modules comprising a plurality of fuel cell modules connected so as to form a fuel cell group having first and second electrical supply terminals configured to be terminated to a load comprising an electrical load, the method comprising:
measuring a load current of respective fuel cell modules,
detecting a respective operating state of the fuel cell modules by way of the load current measured of the respective fuel cell modules,
providing a load current demanded by the load in a full-load operating mode by operating all fuel cell modules, and a load current demanded by the load in a partial-load operating mode of the load by operating all or part of the fuel cell modules,
wherein it is detected whether the respective operating state of one of the fuel cell modules is in a respective partial load range of said one of the fuel cell modules, said respective partial load range being defined by a lower limit above a load current of zero and an upper limit below a full load current,
wherein a load current demanded by the load, in a first partial-load operating mode of the load, is provided by operating said all fuel cell modules of the fuel cell group such that said all fuel cell modules of the fuel cell group are within the respective partial load range of the respective fuel cell modules; and,
wherein it is detected whether the respective operating state of one of the fuel cell modules of the fuel cell group is in the respective partial load range of said one of the fuel cell modules, and in case of detection that the respective operating state of said one of the fuel cell modules is outside the respective partial load range of said one of the fuel cell modules, said one or more of the fuel cell modules of the fuel cell group is deactivated.

13. The method of claim 12, wherein a load current demanded by the load in a lower second partial-load operating mode of the load is provided by operating said all fuel cell modules, such that said all fuel cell modules of the fuel cell group are in an operating state at the lower limit of the respective partial load range of the respective fuel cell modules.

14. The method of claim 12, wherein a load current demanded by the load in a third partial-load operating mode of the load which is still lower than the second partial load operating mode is provided by operating only part of the fuel cell modules of the fuel cell group, such that the operating state of an operated part of the fuel cell modules is within the respective partial load range of the respective fuel cell modules and a non-operated part of the fuel cell modules is deactivated.

* * * * *